Figure 2A:
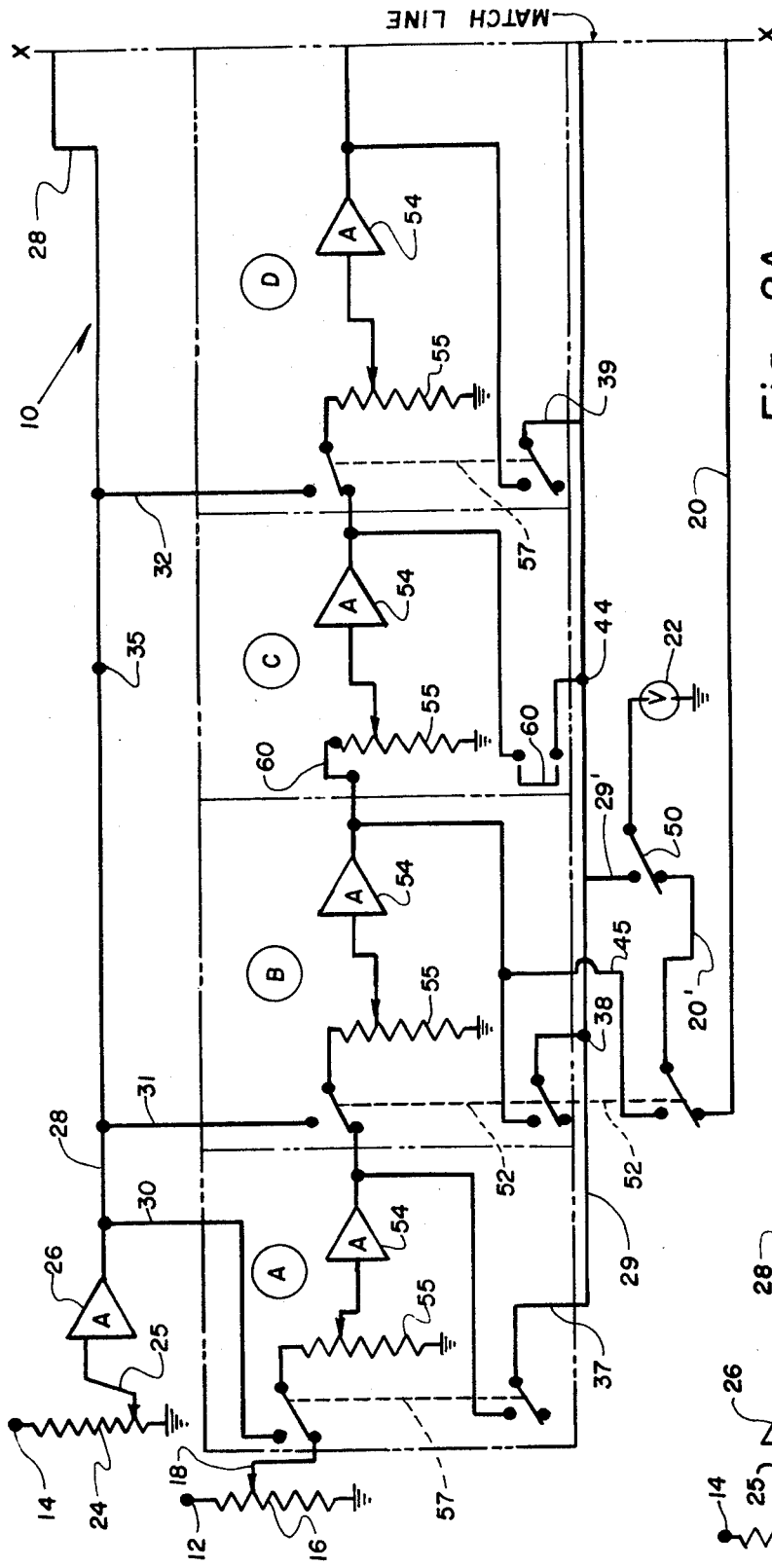

United States Patent [19]
McCorkle

[11] 3,748,453

[45] July 24, 1973

[54] METER RATE COMPUTER

[76] Inventor: Richard E. McCorkle, 1306 Columbus St., Glendale, Calif. 91202

[22] Filed: Feb. 24, 1972

[21] Appl. No.: 229,124

[52] U.S. Cl................. 235/194, 235/184, 235/193, 235/151.34, 73/194 E
[51] Int. Cl. ........................ G06g 7/16, G06g 7/57
[58] Field of Search.................... 235/184, 193, 194, 235/151.34; 73/194 E

[56] References Cited
UNITED STATES PATENTS

| | | |
|---|---|---|
| 2,755,020 | 7/1956 | Belcher, Jr................. 235/151.34 X |
| 3,027,083 | 3/1962 | Heigl et al. ......................... 235/184 |
| 3,591,790 | 7/1971 | Couture............................... 235/193 |
| 3,171,023 | 2/1965 | Des Hons......................... 235/184 X |
| 3,270,190 | 8/1966 | Cambert......................... 235/184 X |
| 3,329,808 | 7/1967 | Fisher ................................. 235/193 |

Primary Examiner—Joseph F. Ruggiero

[57] ABSTRACT

An electrical multiplier circuit for computing the necessary gas flow rate through the meter of a gas sampling apparatus which will provide isokinetic sampling at selected locations of sampling nozzles within a gas flow conducting flue.

9 Claims, 3 Drawing Figures

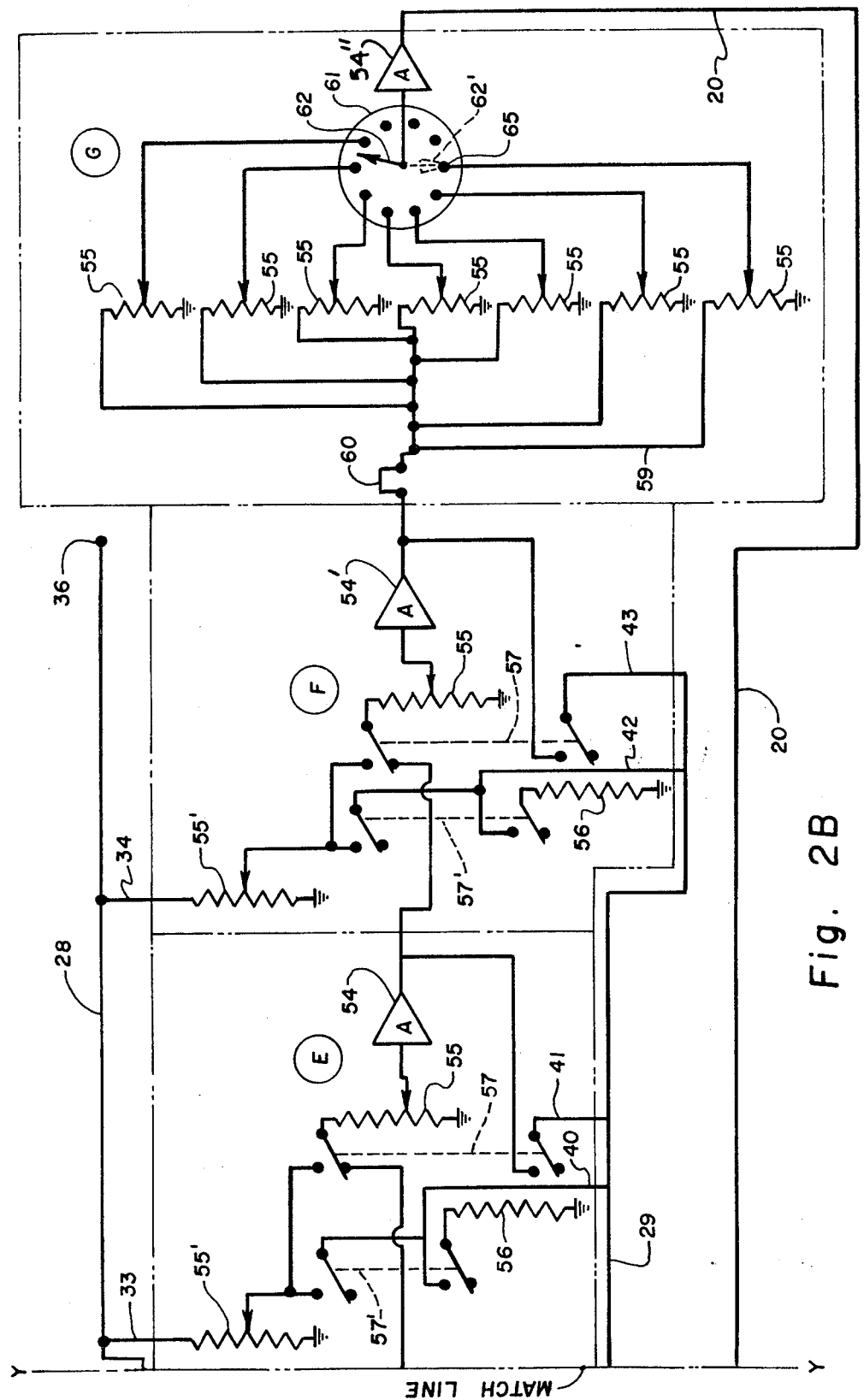

METER RATE COMPUTER

In order to determine the performance of a gas handling or gas cleaning system or to evaluate the necessity of installing a cleaning system, and the like, it is necessary to obtain a measure of the concentration and character of the dust in the gas stream and accurate data regarding the temperature, velocity, and volume of the gas stream itself.

In making such a determination it is often necessary to accurately sample the gas flowing through a gas conducting flue by the use of a gas sampling nozzle positionable at selected points within the flue wherein the gas is flowing. It is well known by those familiar with the field of gas handling and cleaning operations that for best results sampling should be done isokinetically, that is, the flow of gas through the nozzle should be as nearly the same velocity as the flow of the gas through the flue, in the area surrounding the sampling position. Since the rate of gas flow is likely to be different through the areas surrounding any two sampling positions it is necessary to change the rate of flow through the nozzle for each of the different sampling positions in order to match the nozzle flow with the general fluid flow through that area. The gas velocity in the flue can be measured by the use of a standard pitot tube and the rate of gas flow through the nozzle can be calculated from the reading on a meter used in conjunction with some kind of a pump connected to the sampling apparatus which will show the rate of gas flow through the apparatus.

When it is realized that the desired rate of flow to be read on the meter is not the rate of flow through the nozzle but that, starting with the velocity of the gas flow in the flue, corrections must be applied according to the area of the nozzle, the ratio of the temperature of the meter to the temperature in the flue, the volume percent humidity of the gas in the flue, and the ratio of flue pressure to the pressure within the meter it will be realized that calculation of the desired meter rate for as many as 12 different positions across the flue is at best a time consumming and laborious process and at worst can introduce errors into the calculations which might interfere with the accuracy of the determinations being made.

The circuit of this invention provides for direct readout of the desired meter rate for the different positions within the flue with an absolute minimum of adjustment in the circuit to accommodate the different positions of the sampling nozzle.

The object of this invention is therefore to provide a new and novel circuit which with a minimum of adjustment will provide a direct readout of the desired meter rate in cubic feet per minute for any one of a variety of positions within the flue.

Figure 1:
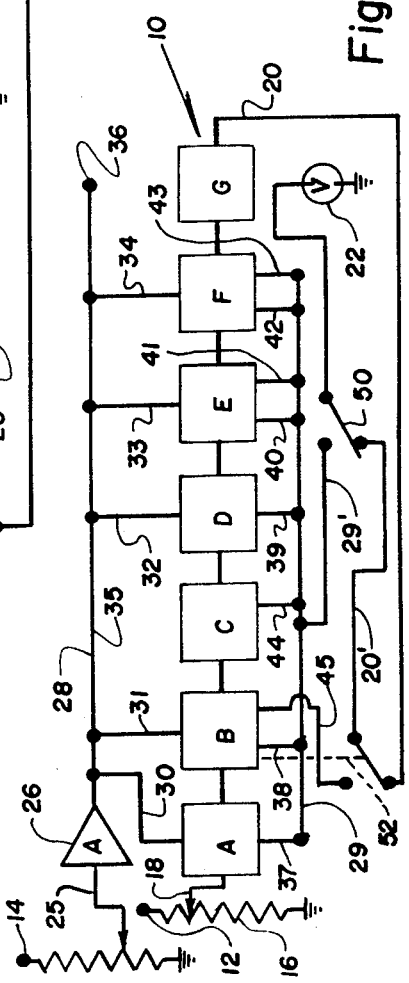

This and other objects and advantages of this invention will be more readily apparent on consideration of the following description and drawings in which:

FIG. 1 is a block diagram of the circuit constructed according to this invention; and FIG. 2 is a more detailed diagrammatic representation of the circuit of FIG. 1 wherein FIG. 2 is constructed by mating match line X—X of FIG. 2A with match line Y—Y of the FIG. 2B to constitute a single figure in a well known manner.

Referring now to the drawings, FIG. 1 is a generalized schematic representation of the voltage multiplier circuit of this invention generally indicated at 10 and comprising a pair of electrical connections 12 and 14 communicating with a constant voltage electrical supply (not shown) of for example 15 volts D.C. Since one side of the voltage supply circuit is ground it will be necessary to show only one side of the circuit leading from the connections 12 and 14 to ground in order to have a complete electrical circuit representation. The connection 12 leads through a potentiometer, having a resistance of 50,000 ohms, to the ground. This potentiometer is adjusted for an output of 10 volts on its variable output connection 18, communicating between the potentiometer 16 and a first stage A of a number of circuit stages connected in series and indicated at A, B, C, D, E, F, and G in the block diagram of FIG. 1 and in the broken line separated stages more specifically shown in FIG. 2. After passing through the stages A through G the current progresses by way of a conductor 20 through suitable switches, hereinafter more specifically described, to a grounded voltmeter graduated to read in millivolts.

The supply connection 14 is connected to ground through a 50,000 ohm potentiometer 24 having an output connection 25 adjusted to deliver a direct current at 1 volt through an operation amplifier 26, set to a gain of one, to supply a steady 1 volt direct current energization of a multiple connection calibration conductor 28 shown connected by conductors 30 through 34 to stages A, B, D and F and also provided with connection points such as phone jacks at points 35 and 36 for connection to stages C and G as desired. An output calibration conductor 29 is shown connected by conductors 37, 38, and 39 to stages A, B and D respectively and by two connectors (40, 41) and (42,43) to stages E and F, respectively, with the conductor 29 selectively connectable to the voltmeter 22 by a single pole double throw switch 50 selectively operable to connect either the conductor 20' or the conductor 29' to the voltmeter 22 depending upon whether the voltmeter is being used to calibrate the stages A through F or when connected to the line 20' being used either for calibration of the stage G or for display of the integrated result of the multiplier circuit in the run mode. The conductor 29 is also provided with a jack 44 for selected connection of the stage C to the calibration conductor 29 when it is desired to calibrate stage C.

In FIG. 1 there is also shown one pole of a 3 pole double throw switch 52 more completely shown in FIG. 2 which in FIG. 1 is seen to be capable of connecting a calibration output connection 45, leading from stage B to switch 52, with the conductor 20' leading to switch 50 as hereinabove set forth or alternatively connecting line 20 to line 20' in the run mode of operation for circuit 10.

As seen in FIG. 2 each of the stages A through E comprises a buffer amplifier set to a gain of one identified in each case as item 54 connected in series with the output of a 50,000 ohm potentiometer so that the 10 volt direct current, supplied at connector 18 of the supply potentiometer 16, reduced in voltage by the potentiometer 55 of stage A, stabilized by buffer amplifier 54 of stage A, becomes the input to stage B.

In stage B the voltage is again reduced by the potentiometer 55 of stage B the output of which, through the buffer amplifier 54 of stage B, becomes the input to a similar arrangement of a potentiometer and buffer amplifier in each of the stages C, D, E, F and G, seriatim, except that amplifiers 54' of stage F and 54" of stage G have a gain of 2 and 10, respectively, as hereinafter more fully described. As the result of all of these voltage reductions in series, a direct current voltage by way of conductor 20, switch 52, conductor 20' and switch 50 is applied to the voltmeter 22 as hereinafter more specifically described.

Referring again to FIG. 2 there is shown in stage A and similarly in stage D a double pole double throw switch 57 shown in the run position as connecting the input from connector 18 to the potentiometer 55 of stage A and D as hereinbefore described but also shown to be capable of connecting the input calibration connectors 30 and 32 respectively to the respective potentiometers in stages A and D and also connecting the output of the respective amplifiers 54 to the calibration line 29 whenever the switch 57 in either stage is operated into the calibration mode.

Thus, for calibration the 1 volt reference potential from calibration conductor 28 is applied to the potentiometer 55 of one stage which modifies the reference voltage. The output from the potentiometer 55 through the amplifier 54 is readable on the meter 22 when the switch 50 is likewise operated into the calibration mode connecting conductor 29' to the meter 22.

In the case of stage B the three pole switch 52 operates in the same manner as switches 57 except that, because of the third pole and the output calibration connector 45, calibration of stage B can be effected without operating switch 50 into the calibration mode for a reason to be made plain hereinafter.

Stage C may be calibrated in the same manner except that, since stage C is not often calibrated as will hereinafter be made plain, instead of a switch, two calibration jumpers are provided so that the input of stage C can be changed from the output of stage B to the jack 35 on calibration conductor 28 and the output of amplifier 54 of stage C can be connected to the jack 44 on the output calibration conductor 29, and with the switch 50 in the calibration mode, stage C will be connected for calibration as described for stages A and D. After calibration of stage C has been accomplished the calibration jumpers 60 will be disconnected from the points 35 and 44 and the calibration jumper 60 connected to the potentiometer 55 of stage C will be reconnected to the output of stage B as seen in FIG. 2 so that stage C will again be in the run mode as shown.

Stages E and F are similarly provided with a double throw double pole switch, connected in the run mode between the potentiometer 55 and the output of the preceding stage and connected in the calibration mode through the respective output connections 41 and 43 to the output calibration conductor 29. But, in each case, the potentiometer 55 is connectable to the input calibration conductor 28 through a calibration potentiometer 55' by way of respective calibration input connectors 33 and 34 for a purpose to be hereinafter made plain.

Stage G is shown to be provided with a special buffer amplifier 54' set for a gain of 10. Stage G is also provided with a number of 50,000 ohm potentiometers 55 (shown as 7 potentiometers but variable to any required number). All of the potentiometers are connected as by respective conductors such as conductor 59, shown at the bottom of stage G, to the input conductor of stage G with the output of each potentiometer 55 being connected to a respective one of the plurality of output contacts such as contact 65 of a rotary switch 61. A contactor 62 is connected to supply the input of the amplifier 54 and operable into position to contact any one of the contacts 65 as shown in broken line representation connected to the bottom potentiometer 55. Thus, any one of the potentiometers 55 of stage G may be put into series with the output from stage F and the amplifier 54 of stage G for the run mode as shown or for calibration by connecting the calibration jumper 60 to the phone jack 36 on the calibration input conductor 28. In either the run or the calibration mode the output of stage G will be connected to the meter 22 through the switches 52 and 50 set in the run mode.

To describe the operation of the circuit of this invention it is necessary to understand the relationships of the parameters involved, which relationships are best expressed in mathematical terms. The basic meter rate equation applicable to dry gas only is as follows:

$RM = 0.33 \times Im/Is \times VS \times d^2 \times Ps/Pb\ Pm$

Wherein the following symbols appear: Rm is the desired meter rate, $Tm$ the absolute temperature, degrees Rankine, of the gas flow meter being employed, $Ts$ the temperature, in the same degrees, of the gases within the flue; $Vs$ the velocity of the gas flow in the flue, $d$ the diameter in inches of the nozzle being used, $Ps$ the gas pressure in inches of mercury within the flue, $Pb$ the barometric pressure at the time of the test, and $Pm$ the number of inches mercury vacuum applied to the meter for producing the desired gas flow. This equation was reviewed and recast in a form more susceptible to analogue techniques as follows:

$Rm = (Vs \times 60)/144 \times a \times Tm/Ts \times Ps/Pb-Pm$

The new form of the equation uses the same symbols with the exception of small "a" which represents the cross sectional area in square inches of the nozzle being used for a particular test.

A correction for humidity was added and the equation again rearranged into its final form in preparation for the design of an analogue circuit to solve the meter rate problem. This new form of the equation appeared as follows:

$$Rm = \frac{|2.9 Fs \times \sqrt{29.92/Pa \times 1.00/Gd \times Ts}|}{\text{Seg. A}} \times \frac{|\sqrt{H}|}{\text{Seg. B}}$$
$$\times \frac{|.4166|}{\text{Seg. C}} \times \frac{|1\text{-Humidity \% by volume}|}{\text{Seg. D}} \times \frac{|Tm/Ts|}{\text{Seg. E}}$$
$$\times \frac{|Ps/Pb - Pm|}{\text{Seg. F}} \times \frac{|a|}{\text{Seg. G}}$$

It is to be noted that with the equation in this form it has been divided into segments identified as segments A through G corresponding to the respective stages of the computer as above identified, wherein each stage now performs an operation which corresponds to the relationship set forth in that segment of the equation. One of the changes that has been applied to give the final form of the equation is the substitution for $Vs$ of its equivalent from the equation $Vs = 2.9\ Fs \times H \times Ts$ wherein $Fs$ is a correction factor for the particular type of special pitot tube being used. H is the pressure gage reading of the pitot tube in inches of water, $Ts$ is the flue gas temperature in degrees Rankine, and $Gd$ is the specific gravity of the gas referred to air as 1.00.

It is to be further noted that all of the above variables have specific values in conjunction with a given test set up and that all of these values except for H are expected to remain constant for a given test set up on a given day. The value for H will of course vary with the velocity of the gas at different points in the gas conducting flue where the readings are being taken. It is because the value of H varies for each different testing area or position that the meter rate must be changed every time the position of the sampling nozzle is changed. It is also for this reason that the stage B is set up to be recalibrated with the operation of the single switch 52 whenever the nozzle position has been changed.

The value for the portion A of the meter rate formula having been determined during pitot measurements and volume determinations has a definite value typically in the range of 50 to 70. Stage A is calibrated by operating the stage A switch 57 into the calibrating mode and changing the switch 50 to connect to the conductor 29' and reading the voltage on the meter 22. By suitable adjustments of the potentiometer 55 in stage A the voltmeter can be made to read the proper value in the range of 500 to 700 millivolts. When stage A is shifted back to the run mode, the same proportion of the 10 volt run potential will be passed through stage A emerging as an input for stage B of between 5 and 7 volts or one tenth of the desired value to be recovered by the ten fold gain of amplifier 54' in stage G.

The portion B of the circuit having been operated into the calibration mode by changing the three pole double throw switch 52 now applies the one volt calibration potential to the potentiometer 55 in circuit portion B and the portion of the one volt passing through potentiometer 55 will be read on the meter 22 regardless of the positioning of switch 50. A typical value for H is 0.26 inch of water with the square root being 0.510 so that for this value the potentiometer 55 of portion B will be adjusted to give a meter reading of 510 millivolts.

The portion C is normally calibrated at the fabrication of the computer to give the value of 60/144, that is, a reading of 0.4166 and is not normally calibrated in the field, however, should it be suspected that portion C is not operating according to this value the calibration jumpers 60 can be used to remove portion C from the run mode and operated into the calibration mode when the value readable on meter 22 should be 416 or 417 millvolts.

Portion D of the circuit performs a correction for humidity. The value set into the circuit here is equal to 1 minus the humidity given in percent by volume. Thus, if we have a 30 per cent humidity by volume we would set in a value equal to 0.7. In order to do this the input D portion of the circuit is switched to the calibration mode as was done for portion A of the circuit and the potentiometer 55 of stage D is adjusted until the meter 22 reads 700 millivolts after which the stage D is returned to the run mode ready for operation.

The portion E of the circuit applies a temperature correction with the settings for this portion of the circuit in terms of degrees Rankine. Typical values for $T_m$ and $T_s$ being $T_m = 530$ and $T_s = 860$. In setting this portion of the circuit the first calibration switch 57' of stage E is operated into the calibration mode and the $T_s$ reference level is established at 860 millivolts on the meter 22. It is to be noted that in the $T_s$ calibration mode the flow of current from the 1 volt calibration line 28 is through the connection 33 and the potentiometer 55' to ground through the output line of the potentiometer 55' to the first calibration switch 57' in the calibration mode which is in communication with the meter 22 through calibration connection 40 and calibration output conductor 29 by way of switch 50 operated into the calibration mode. In parallel with the just recited communication through connection 40 is a switch controlled 50,000 ohm resistance 56 connected to ground for the purpose of substituting for the 50,000 ohm resistance in the potentiometer 55 of stage E so that the value of 860 millivolts on meter 22 will be the same as the action of the calibration potentiometer 55' of stage E when operated in conjunction with potentiometer 55 of stage E.

The next step in the calibration of stage E is to operate the switch 57' into the run mode which removes the resistor 56 and the calibration connection 40 from the circuit and applies the 860 millivolts from calibration potentiometer 55' of stage E to the potentiometer 55 of stage E whichis now connected into the calibration circuit by the operation of switch 57' into the run mode and switch 57 of stage E into the calibration mode. The potentiometer 55 is now adjusted to read 530 millivolts on the meter 22. After this adjustment, when stage E is completely operated into the run mode, the value of the potentiometer 55 of stage E will be equal to 530 divided by 860 or 0.616 for these two values.

The stage F of the circuit is set up in a manner entirely similar to that of the just described state E except for the gain of 2 in amplifier 54' and varies its input by a value which is equal to the flue pressure divided by the actual pressure at the meter which is shown in portion F of the meter rate equation. For example, if Ps is equal to 27.8 inch of mercury, PB equals 29.8 inch, and PM equals 1.3 inch of mercury vacuum then, with calibration switch 57' of stage F in the calibration mode, calibration potentiometer 55' will be adjusted to give a value of PB minus PM which equals 28.5 millivolts after which, switch 57' having been operated into the run mode, switch 57 of stage F is operated into the calibration mode and the potentiometer 55 is adjusted to give a reading of 278 millivolts so that when both switches are in the run position the input of stage F will be decreased by a factor of 0.985 in passing through stage F. If the value of segment F of the meter rate equation is greater than 1, the amplifier 54' set to a gain of 2, makes it possible for stage F to increase the voltage from its input by any suitable factor less than 2.

The portion G of the circuit incorporating the rotary switch 61 is calibrated in much the same manner but for a variety of nozzle sizes as an example if the contact 65 is to provide the setting for a ¼ inch nozzle, the calibration jumper 60 having been connected to the calibration jack 36 on conductor 28, the potentiometer 55 of state G connected to the conductor 59 and having its output to the contact 65 will be adjusted to read 490 millivolts on the meter 22 corresponding to the area of 0.049 square inches for ¼ inch nozzle multiplied by 10 in the amplifier 54' to adjust for the reduction in stage A. Similarly the other connected contact points on the rotary switch 61 can be calibrated for the area of other nozzle sizes but for a single determination the contactor 62 is always kept in a position to connect the contact for the applicable nozzle size to the amplifier 54 of the stage G to apply the proper correction to the meter rate when in the run mode.

With everything in the run mode as shown in FIG. 2 each of the stages A through G will apply its correction to the basic value of flue velocity pressure fed in at stage B as the square root of water gage pressure and the reading on the meter 22 in millivolts will actually be the desired number of cubic feet per minute for the meter rate to give isokinetic sampling at a given position of the sampling nozzle within the flue.

When a new sampling nozzle position is used, a new reading of flue velocity pressure H in inches of water gage will be entered into the meter by proper calibration of stage B to the new value of the square root of H. The proper meter rate for the new nozzle position will then be readable on the voltmeter 22 as soon as the circuitry has been operated into the run mode. This would be done, for example, 12 times for 12 different positions within a given section of flue and the use of the meter rate computer instead of individual calculations will save a great deal of time and improve the accuracy. If a different size nozzle is found to be necessary, adjustment for that change is readily made in stage G by rotating contact arm 62.

In like manner any variations in the parameters from hour to hour, day to day or job to job can readily be applied to put this computer into condition for computing desired meter rates to give isokinetic sampling.

It is to be noted that since the value for stage C is a constant, namely 0.4166 stage C can be eliminated and this value can be applied to the gain of ten in stage G amplifier 54' by setting amplifier 54' for a gain of 4.166 and adjusting the calibration values of nozzle sizes accordingly.

It is further to be noted that interchange of the stages A and B may be desirable to use the basic formula rewritten as $$\frac{|\sqrt{H}|}{\text{Seg. B}} \times \frac{|K|}{\text{Seg. A}} \times \frac{|66/144|}{\text{Seg. C}} \times \frac{|1-\%H_2O|}{\text{Seg. D}}$$
$$\times \frac{|Tm/Ts|}{\text{Seg. E}} \times \frac{|Ps/Pb-Pm|}{\text{Seg. F}} \times \frac{|a|}{\text{Seg. G}}$$

For this version of circuit 10 the input to stage B could be either an internal potentiometer set to provide a voltage equal to H or the voltage could be supplied from an external source. The A section would then be rewired as a variable gain amplifier adjustable for gain values in the range of 5 to 7.

A preferred embodiment of the present invention having been hereinabove described and illustrated it is to be realized that variations in the illustrated circuit are envisioned as possible within the scope of this invention and any such variations are to be taken as within the scope of the instant invention limited only by the claims appended hereto.

What is claimed is:

1. A circuit for determining a given quantity which is dependent upon a plurality of variables comprising, a series connectd plurality of circuit stages, at least certain ones of said stages including selectively operable regulating means for varying the voltage output of said certain ones of said stages, respectively, an electrical meter connected to said series connected circuit stages to indicate the output voltage thereof, said cerain ones of said stages having selectively operable connecting means individually connecting said certain ones of said stages to said meter to indicate the output voltage of said certain ones of said stages in response to the setting of said regulating means therein.

2. The circuit as specified in claim 1 wherein at least some of said selectively operable connecting means are multipole double throw switches.

3. The circuit as specified in claim 1 wherein each of said stages includes a potentiometer applied in said series cicuit.

4. The circuit as specified in claim 3 wherein each of said stages includes an operation amplifier connected to the output of said potentiometer.

5. The circuit as specified in claim 3 wherein at least one of said stages has a second potentiometer connectable in series with the first mentioned potentiometer of said one stage for calibration of said one stage.

6. The method of applying a plurality of gas flow parameters in computing desired gas flow meter rates for isokinetic gas sampling at different nozzle locations comprising the steps of; individually calibrating each of a plurality of voltage varying circuit stages in a multiplier circuit to a value for each stage providing a voltage varying factor corresponding to a respective one of such parameters; connectng all of said stages in a series array with each other between a voltage source and meter means, displaying the product of said values as the desired gas flow meter rate.

7. The method of computing as set forth in claim 6 wherein said calibrating step comprises successively connecting individual ones of said stages between a voltage source and said meter means.

8. The method of computing as set forth in claim 7 comprising the further steps of disrupting said series array, recalibrating at least one of said stages to apply a variation in at least one of such parameters, reconnecting said stages in said series array, and displaying a new gas flow meter rate.

9. The method of computing as set forth in claim 6 wherein at least one of said factors is determined by the ratio of two such parameters.

* * * * *